United States Patent
Kuwabara

[19]

[11] Patent Number: 6,097,709
[45] Date of Patent: Aug. 1, 2000

[54] TDMA CELLULAR COMMUNICATION SYSTEM USING A RECEIVER STATION FOR DETECTING A TIMING DIFFERENCE BETWEEN ADJACENT BASE STATIONS

[75] Inventor: Kenji Kuwabara, Tokyo, Japan

[73] Assignee: NEC Corporation, Tokyo, Japan

[21] Appl. No.: 08/988,281

[22] Filed: Dec. 10, 1997

[30] Foreign Application Priority Data

Dec. 10, 1996 [JP] Japan ................................. 8-329540

[51] Int. Cl.[7] .......................................... H04J 3/06
[52] U.S. Cl. ..................... 370/331; 370/337; 370/350
[58] Field of Search ..................... 370/329, 331, 370/332, 336, 337, 347, 350; 455/436, 438, 443

[56] References Cited

U.S. PATENT DOCUMENTS

| | | | |
|---|---|---|---|
| 5,260,943 | 11/1993 | Comroe et al. | 370/332 |
| 5,550,992 | 8/1996 | Hashimoto | 370/337 |
| 5,710,765 | 1/1998 | Lee et al. | 370/321 |
| 5,761,198 | 6/1998 | Kojima | 370/337 |
| 5,805,983 | 9/1998 | Naidu et al. | 455/67.6 |
| 5,828,659 | 10/1998 | Teder et al. | 370/328 |

*Primary Examiner*—Min Jung
*Attorney, Agent, or Firm*—Scully, Scott, Murphy and Presser

[57] ABSTRACT

In a time-division multiple access cellular mobile communication system, first and second base stations respectively provide coverages over adjacent cells. A receiver station is located in a region where the coverages of the base stations partially overlap for receiving first and second synchronization signals from the first and second base stations, respectively, to detect a time difference between the received synchronization signals. The receiver station then communicates time difference data to the first and second base stations, the data representing the detected time difference and channel identifiers of the first and second base stations. The first and second base stations time-division multiplex the time difference data with a downlink traffic signal and broadcast the multiplexed time difference data. A mobile station is arranged to receive the multiplexed time difference data from the first base station and makes a timing adjustment with respect to the second base station according to the time difference data.

6 Claims, 4 Drawing Sheets

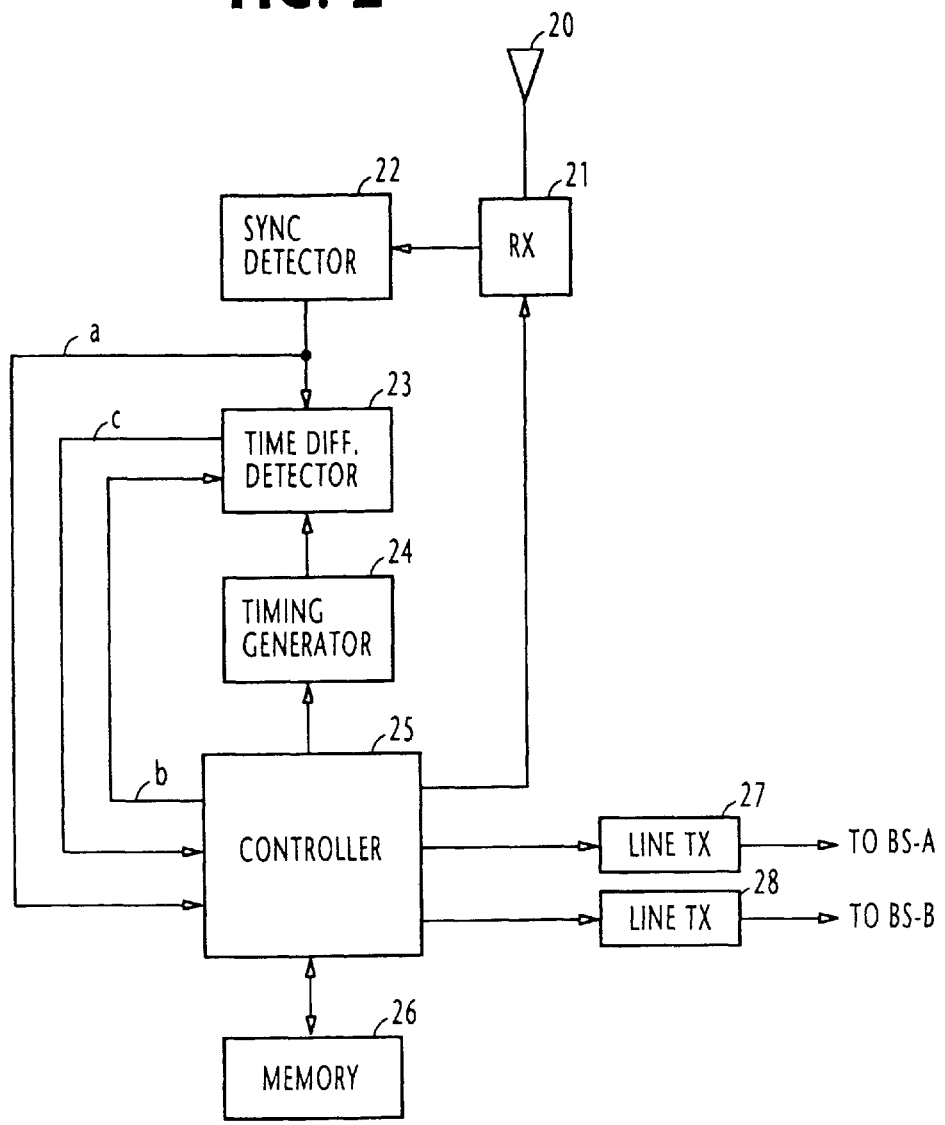

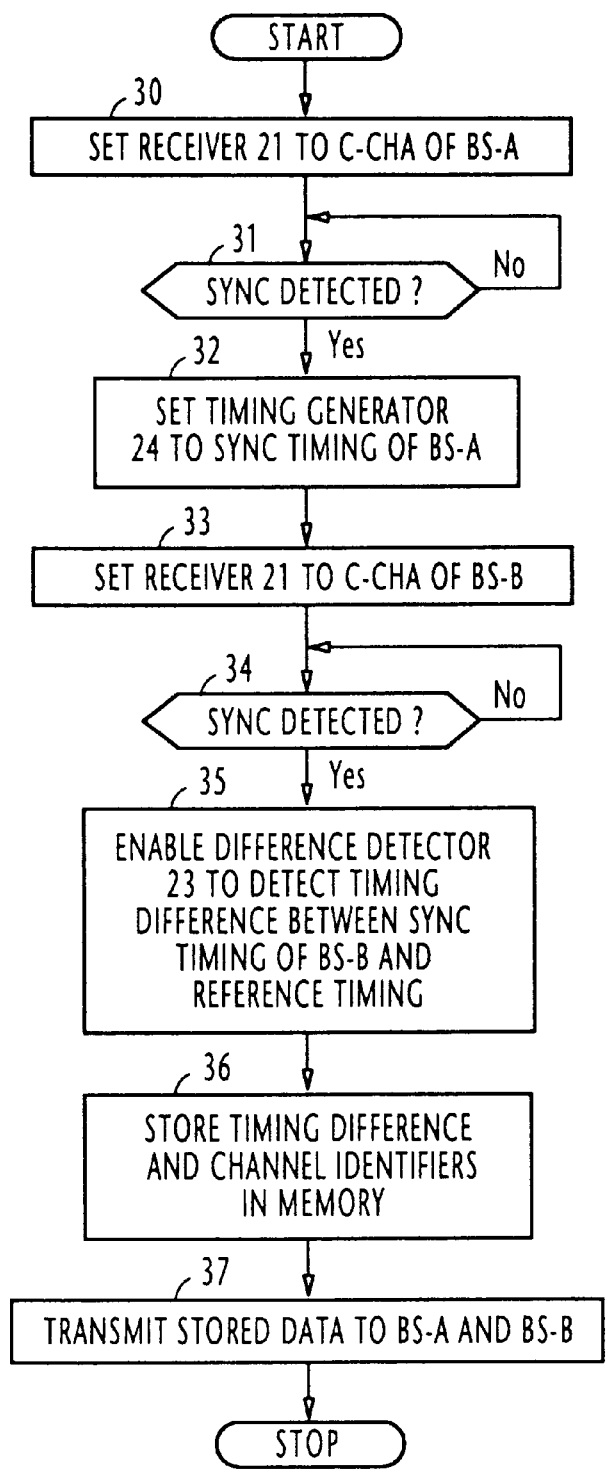

BASE STATION A

MOBILE STATION MS

TDMA CELLULAR COMMUNICATION SYSTEM USING A RECEIVER STATION FOR DETECTING A TIMING DIFFERENCE BETWEEN ADJACENT BASE STATIONS

BACKGROUND OF THE INVENTION

1. Field of the Invention

The present invention relates generally to inter-cell handover techniques for time-division multiple access (TDMA) cellular mobile communication systems, and more specifically to a technique for synchronizing a mobile station to adjacent cell-site base stations during handover operation. The present invention is particularly useful for power-saving the battery consumption of TDMA mobile stations.

2. Description of the Related Art

Japanese Laid-Open Patent Specification Hei-4-371028 discloses a mobile station for a TDMA cellular communication system. During periodic idle slots, the mobile station receives a signal from a base station adjacent the current, communicating base station. From the received signal, the mobile station detects the identifier of the adjacent station and stores it in memory. At the same time, a frame number sent from this base station is also detected and stored in the memory. The stored frame number is then compared with a frame number received from the communicating base station and an inter-frame difference is detected between the two base stations. This process is repeated for all adjacent base stations. The detected inter-frame difference data are mapped in a table to individual base stations. When the mobile station receives a handover command signal from one of the base stations, it reads out corresponding frame difference data from the mapping table to adjust its timing.

Since the prior art requires the mobile station to constantly monitor the idle slots to collect timing data from surrounding base stations, it suffers considerable battery consumption. In addition, the prior art requires the mobile station to be equipped with sufficient hardware to process the received signals. Further, the prior art technique takes time to collect timing data since the mobile station hunts for a synchronization signal from a non-communicating base station at period idle slot intervals.

SUMMARY OF THE INVENTION

It is therefore an object of the present invention to provide an effective solution to the various problems associated with TDMA mobile stations.

According to a first aspect of the present invention, there is provided a time-division multiple access cellular mobile communication system comprising first and second base stations respectively providing coverages over adjacent cells. A receiver station is located in a region where the coverages of the base stations partially overlap, the receiver station receiving first and second synchronization signals from the first and second base stations, respectively, detecting a time difference between the received synchronization signals and communicating time difference data to the first and second base stations, which represents the detected time difference and channel identifiers of the first and second base stations. The first and second base stations provide time-division multiplexing the time difference data with a downlink traffic signal and broadcasting the multiplexed time difference data. A mobile station is arranged to receive the multiplexed time difference data from the first base station and makes a timing adjustment with respect to the second base station according to the time difference data.

In a specific aspect, the mobile station is arranged to store the received time difference data in memory, read the stored time difference data from the memory during an idle slot according to relative field strengths of surrounding base stations, and make the timing adjustment according to the time difference represented by the data read from the memory. The mobile station informs the first base station of a result of the timing adjustment. Using the result of the timing adjustment, the first base station determines which base station the mobile station is to be handed over. Preferably, the mobile station is arranged to expand receive interval of time-division duplex operation after the timing adjustment is made for making a search through the radio link for a synchronization signal and returning the receive interval to normal when the synchronization process is completed.

BRIEF DESCRIPTION OF THE DRAWINGS

The present invention will be described in further detail with reference to the accompanying drawings, in which:

FIG. 2 is a block diagram of each of the receiver stations of FIG. 1;

FIG. 3 is a flowchart of the operation of the receiver station associated with base stations A and B;

FIG. 4 is an illustration of a mapping table of the base station A for storing timing difference data of the other base stations;

DETAILED DESCRIPTION

Figure 1:
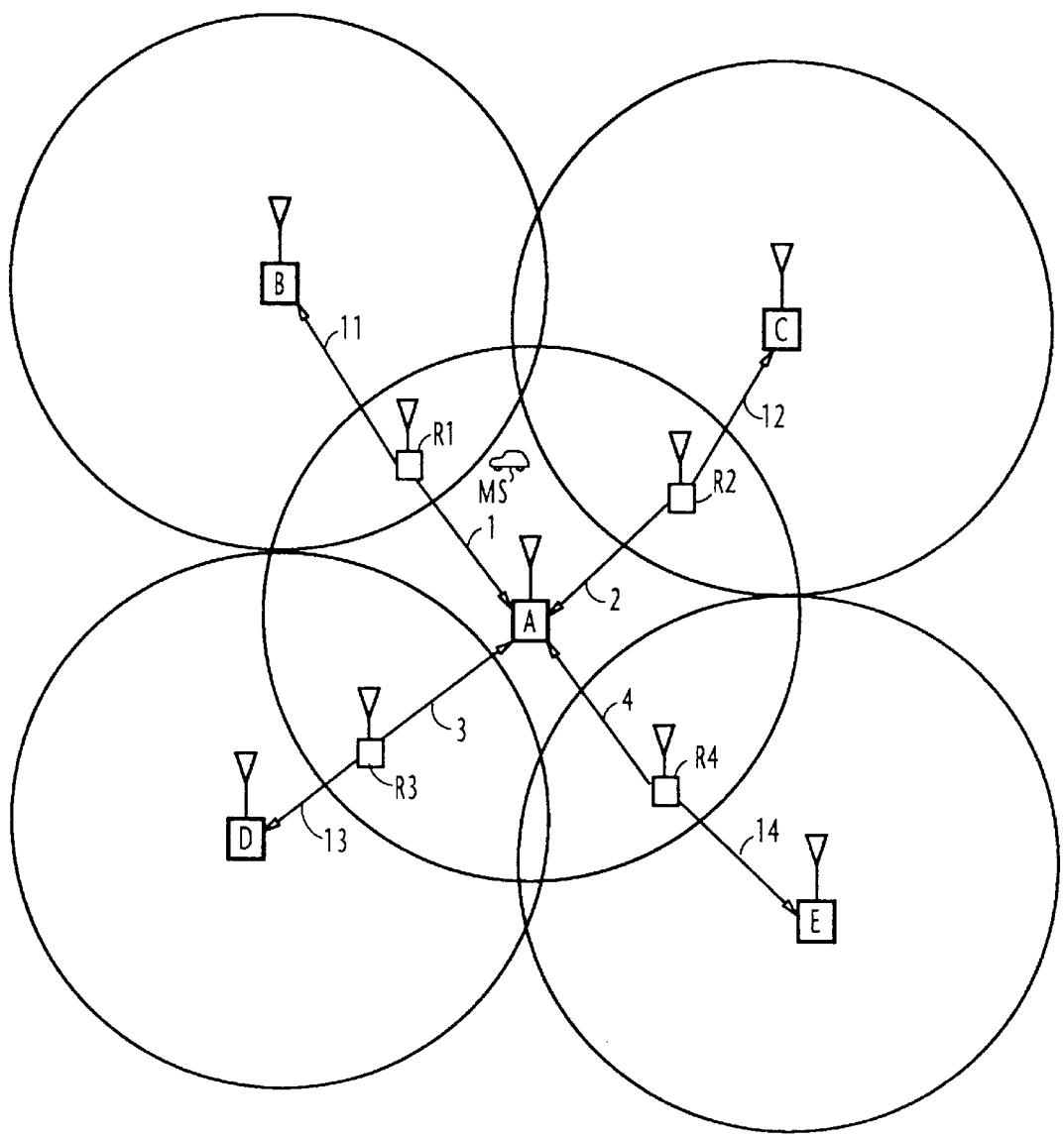
FIG. 1 is a diagram illustrating the geographical locations of radio stations employed in a TDMA cellular mobile communication network of the present invention.

Referring to FIG. 1, a TDMA (time-division multiple access) cellular mobile communication network of the present invention is illustrated as a simplified example. A plurality of radio base stations A, B, C, D and E are illustrated in a cluster for the purpose of disclosure, with the base station A being located at the center of the cluster. The service areas, or cells defined by the base stations A to E partially overlap with those of adjacent base stations. For clarity, the base station A has large overlapping areas with the other base stations. In these overlapping areas are provided radio receiver stations R1, R2, R3 and R4 connected to the base station A by control links 1, 2, 3 and 4, respectively, and further to base stations B, C, D and E via control links 11, 12, 13 and 14.

Since all receiver stations are of identical construction, receiver station R1 is taken as an example to illustrate its details in FIG. 2. Receiver station R1 includes an antenna 20 for receiving signals from base stations A and B. A receiver 21 is connected to the antenna 20, the receiver being tunable to the frequencies of the control channels allocated to both base stations A and B under control of a controller 25 in order to detect the baseband of the tuned frequency. The output of the receiver 21 is supplied to a sync detector 22 which compares the input signal with a predetermined sync bit pattern and produces an output when they match. A time difference detector 23 is provided to detect a timing difference between the output of sync detector 22 and a reference timing signal produced by a timing generator 24. The operation of the time difference detector 23 and timing generator 24 is controlled by the controller 25. A memory 26 is connected to the controller 25 to store time difference data. Line transmitters 27 and 28 are connected to the controller 25 to transmit the stored time difference data to the associated base stations, i.e., base stations A and B.

The operation of the controller 25 will be described with the aid of the flowchart of FIG. 3. At step 30, controller 25 sets the receiver 21 to the control channel of base station A. Flow proceeds to step 31 to monitor the output of sync detector 22 on lead "a" and checks to see if a synchronization bit pattern is detected in the control channel of base station A. If the decision is affirmative, flow proceeds from step 31 and step 32 to set the timing generator 24 to the sync timing of base station A. In this manner, the timing generator 24 of receiver station R1 is synchronized to base station A. Controller 25 now proceeds to step 33 to set the receiver 21 to the control channel of base station B, and then to step 34 to monitor the output of sync detector 22 and checks to see if a synchronization bit pattern is detected in the control channel of base station B. If the decision is affirmative, the controller proceeds from step 34 to step 35 to enable the time difference detector 23 through a control line "b" to detect a timing difference between the sync timing of base station B and the reference timing of the receiver station R1. Controller 25 receives the detected time difference via a read line "c" and stores it in memory 26 together with the identifiers of the control channels of base stations A and B (step 36). At step 37, data representing the time difference between base stations A and B and the identifier of the control channel of base station B are periodically read from memory 26 and transmitted to base station A via line transmitter 27, and simultaneously, data representing the same time difference and the identifier of the control channel of base station A are read from memory 26 and transmitted to base station B via line transmitter 28. The time difference data obtained in this way at receiver station R1 is useful only for mobile station MS when moving across the boundary of base stations A and B in either direction.

Since the operating conditions of base stations may vary with time and ambient temperature, the above described routine is repeated at periodic intervals to renew the contents of memory 26.

In like manner, other receiver stations determine their time difference data and transmit it with control channel identifiers to associated base stations. Specifically, receiver station R2 produces data representing the time difference between base stations A and C and transmits it with the control channel identifier of base station C to base station A and transmits it with the control channel identifier of base station A to base station C. Receiver station R3 produces data representing the time difference between base stations A and D and transmits it with the control channel identifier of base station D to base station A and transmits it with the control channel identifier of base station A to base station D. Receiver station R4 produces data representing the time difference between base stations A and E and transmits it with the control channel identifier of base station E to base station A and transmits it with the control channel identifier of base station A to base station E.

Base station A receives such time difference data from receiver stations R1, R2, R3 and R4 via control links 1, 2, 3 and 4 and stores them in a mapping table. As shown in FIG. 4, the identifiers of control channels of base stations B, C, D and E are mapped to corresponding time difference values with respect to base station A.

Figure 5:
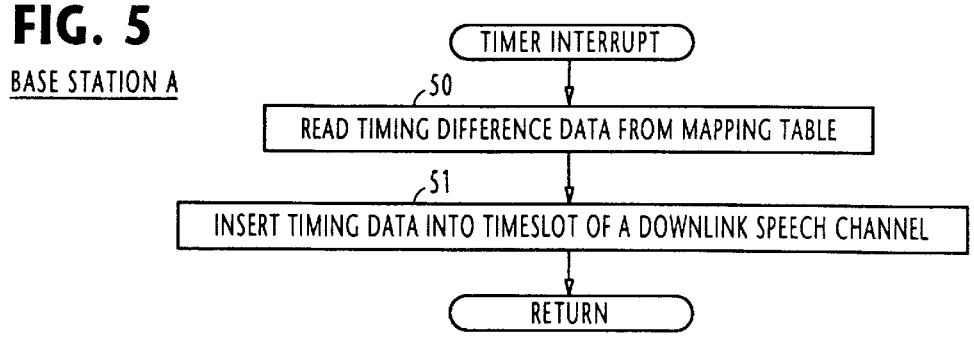
FIG. 5 is a flowchart of a timer interrupt routine of a base station.
Figure 6:
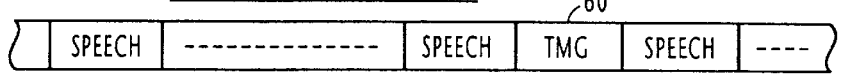
FIG. 6 is an illustration of the structure of a downlink speech channel transmitted from a base station to a mobile station with timing data multiplexed with speech time slots.

As illustrated in FIG. 5, the base station A performs a timer interrupt routine at periodic intervals by reading time difference data from the mapping table (step 50) and inserting the data into a predetermined time slot 60 of a downlink speed (traffic) channel (step 51) as shown in FIG. 6.

Figure 7:
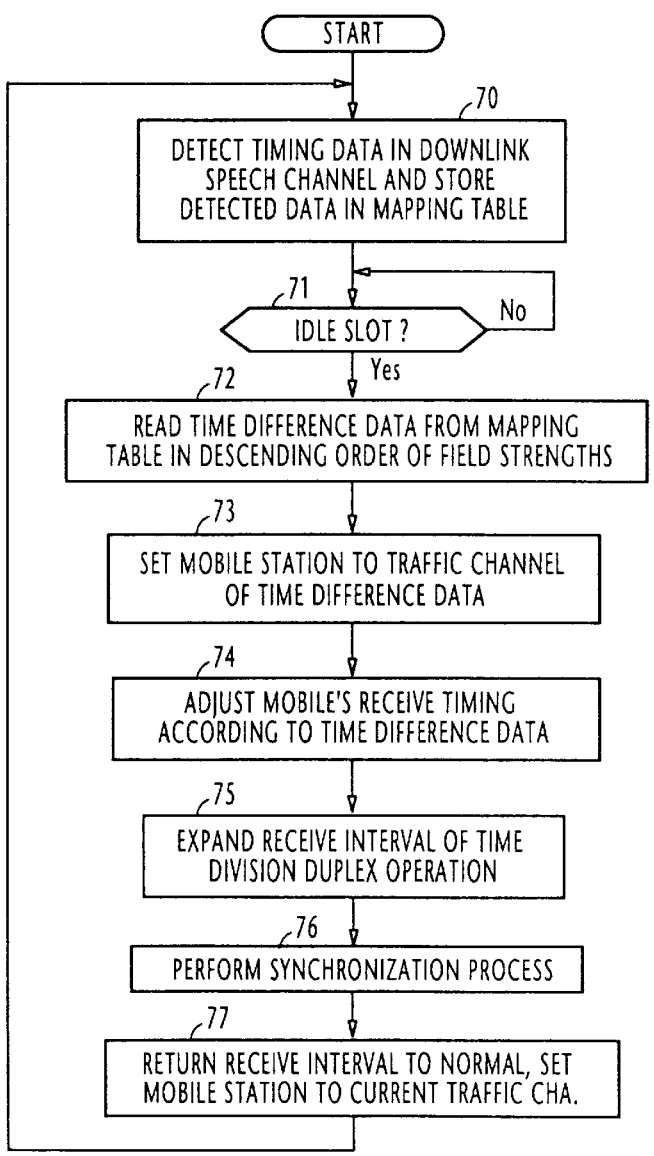
FIG. 7 is a flowchart of the operation of a mobile station.

The operation of the mobile station MS in FIG. 1 will be described with reference to the flowchart of FIG. 7 when moving from the cellsite area of base station A and entering its overlapping region with base station B.

Prior to entering the overlapping region, the mobile station MS is constantly receiving signals from surrounding base stations during idle slots of a downlink traffic channel to determine their relative field strengths as well as the time difference data broadcast from the base station A on a predetermined time slot of the downlink traffic channel to store the received time difference data in a format identical to that shown in FIG. 5 (step 70). Therefore, the mobile station has a replica of the mapping table of base station A. When the mobile station has entered the overlapping region of base stations A and B and the strength of signal received at base station B exceeds a predefined threshold. During subsequent idle slots, the mobile station looks up the replica of the mapping table to read the time difference data in descending order of the determined field strengths. Specifically, when the mobile station detects an idle slot (step 71), it looks up the mapping table to read one of the time difference data, i.e., of the base station B in the illustrated example. At step 73, the mobile station is set to a traffic channel to specified by the time difference data read from the mapping table and then adjusts its receive timing according to the read time difference data (step 74). Since the time difference value between base stations A and B is determined uniquely by the location of receiver station R1, it differs slightly from a time difference value which would otherwise be derived at the current location of the mobile station. In order to absorb the time difference error, the receive interval of the mobile station operating in the time-division duplex mode is expanded to increase the chance of receiving a synchronization signal (step 75). The mobile station performs a synchronization process with the specified traffic channel of an adjacent base station (step 76), resets the receive interval to normal and sets the mobile station to the current downlink traffic channel (step 77) and returns to the starting point of the routine. The above process is repeated for each of subsequent idle slots of the current traffic channel and the mobile station informs the base station A of the results of synchronization with surrounding base stations to allow it to A to allow it to determine which base station the mobile station is to be handed over. A handover command signal will then be transmitted from base station A to the mobile station.

What is claimed is:

1. A time-division multiple access (TDMA) cellular mobile communication system comprising:

first and second base stations respectively providing coverages over adjacent cells;

a receiver station located in a region where the coverages of said base stations partially overlap, said receiver station receiving first and second synchronization signals from said first and second base stations, respectively, detecting a time difference between the received synchronization signals and communicating time difference data to said first and second base stations, said data representing the detected time difference and channel identifiers of said first and second base stations, said first and second base stations time-divisions multiplexing said time difference data with a downlink traffic signal and broadcasting the multiplexed time difference data; and a mobile station for receiving the multiplexed time difference data from said first base station and making a timing adjustment with respect to said second base station according to said time difference data.

2. A TDMA cellular mobile communication system as claimed in claim 1, wherein said mobile station is arranged to:

store the received time difference data in memory;

read the stored time difference data from the memory during an idle slot according to relative field strengths of surrounding base stations;

set the mobile station to a radio link specified by the channel identifier of the read time difference data;

make said timing adjustment according to the time difference represented by the data read from the memory; and informs the first base station of a result of said timing adjustment.

3. A TDMA cellular mobile communication system as claimed in claim 2, wherein said mobile station is arranged to expand receive interval of time-division duplex operation after said timing adjustment is made for making a search through said radio link for a synchronization signal and returning the receive interval to normal.

4. A method of synchronizing a mobile station to base stations of a time-division multiple access (TDMA) cellular mobile communication system, comprising the steps of:

a) installing a receiver station in a region where coverages of first and second base stations partially overlap;

b) receiving, at said receiver station, first and second synchronization signals from said first and second base stations, respectively;

c) detecting a time difference between the received synchronization signals;

d) communicating time difference data to said first and second base stations, said data representing the detected time difference and channel identifiers of said first and second base stations;

e) time-division multiplexing said time difference data, at said first and second base stations, with a downlink traffic signal and broadcasting the multiplexed time difference data; and f) receiving, at a mobile station, the multiplexed time difference data from the first base station and making a timing adjustment with respect to the second base station according to said time difference data.

5. The method of claim 4, wherein the step (f) further comprises the steps of:

storing the received time difference data in memory;

reading the stored time difference data from the memory according to relative field strengths of surrounding base stations;

setting the mobile station to a radio link specified by the read time difference data;

making said timing adjustment according to the time difference represented by the data read from the memory; and informing the first base station of a result of the timing adjustment.

6. The method of claim 5, further comprising the steps of:

expanding receive interval of time-division duplex operation after said timing adjustment is made;

making a search through said radio link for a synchronization signal; and returning the receive interval to normal.

* * * * *